Dec. 12, 1961    R. M. KULSRUD ET AL    3,012,955
HIGH TEMPERATURE REACTOR
Filed Aug. 20, 1958    3 Sheets-Sheet 1
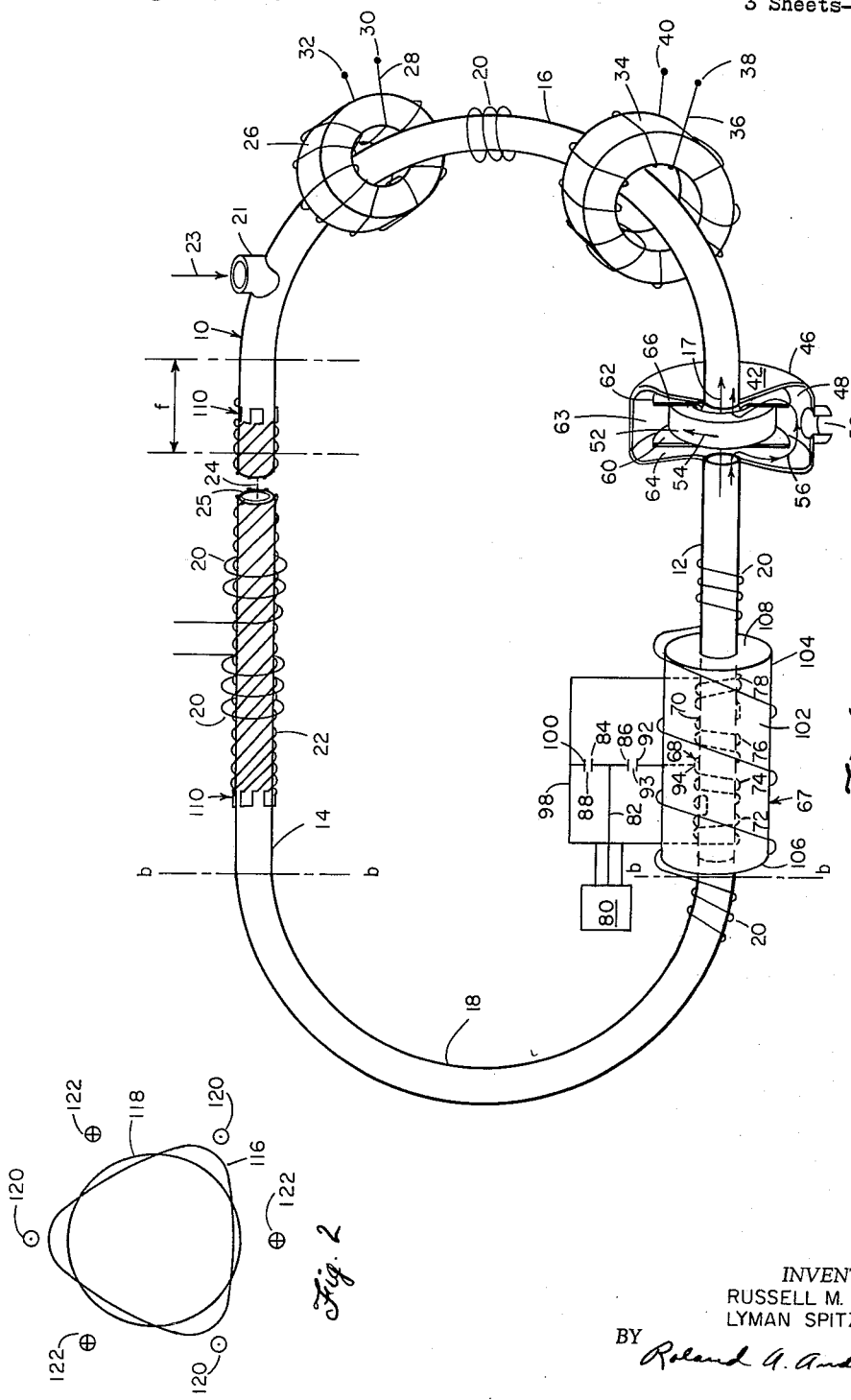
INVENTORS
RUSSELL M. KULSRUD
LYMAN SPITZER, JR.
BY Roland A. Anderson Dec. 12, 1961  R. M. KULSRUD ET AL  3,012,955
HIGH TEMPERATURE REACTOR Filed Aug. 20, 1958  3 Sheets-Sheet 3

INVENTORS
RUSSELL M. KULSRUD
LYMAN SPITZER, JR.
BY
Roland A. Anderson

United States Patent Office 3,012,955
Patented Dec. 12, 1961

3,012,955
HIGH TEMPERATURE REACTOR
Russell M. Kulsrud and Lyman Spitzer, Jr., Princeton, N.J., assignors to the United States of America as represented by the United States Atomic Energy Commission
Filed Aug. 20, 1958, Ser. No. 756,502
9 Claims. (Cl. 204—193.2)

This invention relates generally to high temperature plasma reactors and more particularly to thermonuclear reactors of the stellarator class for controlling high temperature plasma and producing nuclear reaction products.

A thermonuclear reactor of the stellarator class includes a torus-like endless tube in which there is established a plasma of low atomic number elements, such as deuterium and/or tritium. The plasma is stably confined within the tube by a magnetic field which defines a helical magnetic surface in a portion of the tube.

In accordance with this invention, a helical magnetic surface in a portion of the stellarator tube is transformed into a circular magnetic surface in an adjacent portion thereof whereby the efficiency of a stellarator is increased. The helical magnetic surface is established by helical windings on the stellarator tube. The circularizer includes a current loop at the end of each helical winding.

In accordance with this invention, the plasma pressure of a stellarator for a given magnetic field pressure is increased by means of a reverse curvature section in the stellarator tube.

An object of this invention is to provide a circularizer for a stellarator to transform a helical magnetic surface in a portion thereof into a circular magnetic surface in an adjacent portion whereby the efficiency of a stellarator is increased.

Another object of this invention is to provide a reverse curvature section for a stellarator to increase the plasma pressure for a given magnetic field pressure.

These and other objects of the invention will be understood upon consideration of the following discussion and claims taken in conjunction with the drawings in which:

FIGURE 1 shows a diagrammatic view partially cut away, of a thermonuclear reactor of the stellarator class incorporating one embodiment of the circularizer.

FIGURE 2 is a line drawing illustrating helical windings, a helical magnetic surface established by the helical windings, and a circular magnetic surface into which the helical magnetic surface is transformed.

Figure 3:
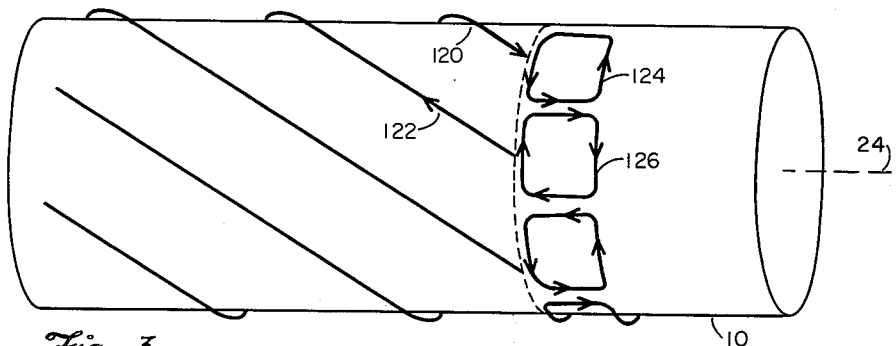
FIGURE 3 is a diagrammatic view of a portion of the stellarator tube showing helical windings and current loops illustrating the principle of the circularizer.

Referring to FIG. 1, a high temperature reactor for confining and heating a plasma is shown which embodies the features of this invention.

A plasma is a gaseous state of matter in which some or all of the atoms are ionized and the total ion charge is neutralized by electrons. When two ions of a plasma comprising ions of low atomic number elements such as deuterium and/or tritium collide, there is a possibility that a thermonuclear reaction will occur. The value of the probability increases as the relative energy of the two ions increases. Such thermonuclear reactions result in an output of energy by the plasma. This output energy equals the external energy transferred to the plasma at a "threshold plasma temperature" and exceeds it above the threshold.

Briefly, a thermonuclear reactor of the stellarator class includes a container in which thermonuclear reacting material ("reactants") is confined, and in which energy from thermonuclear reactions is released in the form of high energy radiation or emitted nuclear particles ("reacted particles"). The reactants during thermonuclear reactions are in the form of a gas.

One embodiment of a thermonuclear reactor of the stellarator class incorporates a torus-like tube within which a fully ionized, high temperature plasma is confined. The plasma is confined within the tube by a static, magnetic field established by two different types of electrical windings on the tube. First there is a winding which establishes a strong axial, toroidal, magnetic field in the tube. Second there is a helical winding which adds to the axial magnetic field a rotational transform and a radial variation thereof. A radial variation can stably confine a plasma away from the tube wall. Reference is made to the patent application S.N. 705,071, filed December 24, 1957, for Spitzer for a complete description of the helical winding for a stellarator. The tube is evacuated to a high vacuum, and a pure gas of thermonuclear reactive atoms of controlled composition is admitted therein.

The gas is initially ionized to a plasma by a radiofrequency discharge or a high electric field pulse. The plasma is then ohmically heated. Thereafter the plasma is raised to a thermonuclear-reaction-sustaining temperature by generation of ion cyclotron motions and ion cyclotron waves in the plasma by a magnetic pumping section incorporating a resonating section having an induction coil surrounding the plasma. The efficiency of the magnetic pumping section is an inverse measure of the power it requires to raise the plasma to thermonuclear-reaction-sustaining temperature. The coil is made up of helical sections, and the azimuthal direction of current flow is caused to alternate every half wave length in the coil axial direction. The helical sections are connected electrically in a series-parallel pattern, and their total inductance is resonated with a capacitor network by a radiofrequency voltage generator. Thus the current in the induction coil varies periodically with both time and distance along the direction of the plasma confining magnetic field. The radiofrequency current in the induction coil induces an electric field in the plasma. The frequency and wave length of the electric field are chosen close to a frequency and wave length of a resonance in the plasma so that it will be properly excited.

At least one diverter is provided in the stellarator reactor tube for removing impurity ions from the plasma. Impurity ions comprise those ions which are derived both from the plasma and by bombardment of the tube wall by energetic particles. The diverter removes such impurity ions as are near the tube wall. The impurity ions are undesirable for a thermonuclear-reaction-sustaining plasma because they are "cold," have a high atomic number or are reactants rather than reacted particles. The efficiency of divertor is a measure of its ability to remove impurity atoms quickly from the stellarator tube. In the divertor there is an electrical winding energized oppositely to the windings that produce the main confining magnetic field.

The divertor winding bends outward the main confining magnetic field lines near the wall of the torus so that these field lines pass into an enlarged section of the torus. This section or divertor chamber has an annular, non-magnetic, conductive collector plate whose inner radius is at least as large as the minor radius of the torus. The magnetic lines of the main confining magnetic field, which are bent into the divertor chamber, pass through the collector plate and then reenter the reactor tube. The impurity ions (which are adjacent to the torus wall) follow the magnetic lines into the divertor and are prevented by the collector plate from reentering the reactor tube. They are removed from the divertor by a vacuum pump.

A neutron moderating means and coolant are placed near the outer wall of the stellarator tube to absorb energy released therein in the form of energetic particles and electromagnetic radiation.

In order to provide a magnetic field configuration for the stellarator which provides for the stable confinement of a plasma, helical magnetic fields are superimposed upon its main toroidal field. The helical fields are produced by helical windings on the stellarator tube. These fields produce a rotational transform which insures the existence of magnetic surfaces. Every magnetic line of force in the stellarator is confined to one of these surfaces. A magnetic line generates the surface on which it lies and, in going around the stellarator tube many times, it passes through every point on the surface.

It is important that a stellarator have the magnetic field configuration which has the optimum magnetic surfaces. Two criteria which may be used to determine the optimum magnetic field are: (1) The stellarator tube should contain the maximum amount of plasma for its size; (2) the magnetic surfaces should be circular in the divertor and the magnetic pumping sections. As the divertor and the magnetic pumping sections are built with circular symmetry, this insures their most efficient operation and thus the most efficient operation of the stellarator. The divertor deflects lines of force which pass through it a certain distance from the tube wall. It operates most efficiently if the magnetic surfaces passing through it have circular cross section as it can then deflect the maximum number of lines of force on the outer magnetic surface. If the cross sections of these surfaces are not circular in the divertor but triangular the impurity ions on the surface which are furthest from the wall of the tube go around the stellarator tube a number of times before they pass through the divertor at a magnetic radius which the divertor can deflect. When the magnetic surfaces are circular in the divertor, impurity ions thereon are removed with equal facility. This lessens the time the undesired impurity ions remain in the stellarator, and the efficiency of the divertor is increased.

The magnetic pumping section works most efficiently if the magnetic surfaces passing through it are circular. This is because the radius of the coils of the magnetic pumping can then be smaller without touching the maximum magnetic surface confined in the stellarator. If the inner radius of a coil is made smaller while producing a given magnetic field, the power it consumes in resistive losses is less, and it operates more efficiently.

It is useful for the design of the current loops to treat the torus-like tube of the stellarator as though it were an infinite cylinder and the surfaces in the helical region were its natural surfaces.

The magnetic surface will have regions which lie inside and others which lie outside the cylindrical surface into which it is desired to form it. In accordance with this invention, a magnetic field is applied of such a nature that it pushes the outside portions in and pulls the inside portions out. This is done by placing current loops at the point of termination of the helical windings of such strength and polarity as to accomplish this.

Current flow in the stellarator tube along the lines of force may limit the plasma pressure for a given magnetic field pressure. It is important that the ratio of plasma pressure to magnetic field pressure be as large as possible since the power output of the stellarator varies as the square of the ratio. In accordance with this invention, the plasma pressure for a given magnetic field pressure can be increased by incorporating a reverse curvature section in an end loop of the stellarator tube.

In this reverse curvature end loop, currents flow along a line of force from a short section of positive curvature to a short section of negative curvature and vice versa along other lines of force. With proper design, the charge separations in these two sections produce equal and opposite currents, along each line of force, so that the current generated in one terminates in the other. In the absence of other reverse curvature end sections, this current would flow much further along the line of force, i.e., the current would flow along a line of force until the rotational transform sufficed to rotate the line by 180°, at which point the current would terminate. Since the limitation of plasma pressure by these currents depends on the length of path over which the current flows, the reverse curvature end loops, with the very short current path which they cause along the lines of force, permit a much higher plasma pressure.

Referring now to FIGURE 1, there is shown a torus-like, non-magnetic tube 10 defining an endless chamber 11. It is formed of two equal length parallel sections 12 and 14 joined at their respective extremities by semi-circular sectors 16 and 18. A radial tubular duct 21 into sector 16 serves both as an inlet for reactant gas atoms 23 from a reactant-gas source, not shown, and for evacuation of chamber 11 to a high vacuum, such as $10^{-6}$ millimeters of mercury, for example, by a vacuum pump means, not shown.

A toroidal magnetic field is established everywhere in the chamber 11 by an electrical winding 20 (a portion thereof being shown on parallel sections 12 and 14 and circular sectors 16 and 18) energized in a conventional manner by a direct voltage source, not shown. Electrical winding 20 is wound over tube 10 throughout its length. The lines of force produced by this winding are continuous around the torus. Helical windings 22 underlie winding 20 over a part of the length of tube 10. It is preferable that helical winding 22 be wound everywhere on tube 10 except in the divertor section 42 and magnetic pumping section 67. They are preferably four or six in number and are evenly spaced about tube 10 as viewed at cross section 25. Adjacent helical windings 22 are energized oppositely and impart to the axial field established by winding 20 a field component such that the resultant field is characterized by a rotational transform having a radial variation. The effect of the rotational transform is that each magnetic line established by windings 20 and 22 in cooperation, after it has made one traversal of the tube 10, has a particular angular displacement instead of closing on itself. Because of the radial variation, this angular displacement increases as the distance of a field line from the magnetic axis 24 of tube 10. The radial variation is a gradient of the aforesaid angular displacement with distance from the magnetic axis such that magentic lines farther from the axis 24 of chamber 10 wind about the axis 24 in tighter and tighter helices.

An annular ferrite ring 26 is disposed about tube 10 at section 16 thereof. Electrical winding 28 is wound on ring 26. A radio frequency voltage appears along axis 24 of chamber 11 when winding 28 is energized at its terminals 30 and 32 by a radiofrequency voltage source, not shown. There occurs as a result thereof a radio-frequency discharge in the gas atoms 23 which ionizes them to a plasma.

A laminated iron annular ring 34 is disposed about section 16 of tube 10 for ohmic heating of the plasma in chamber 11. Wound upon ring 34 is an electrical winding 36 which is energized at its terminals 38 and 40 by an audiofrequency voltage source, not shown. Laminated iron ring 34 and its energized winding 36 cause ohmic heating of the plasma by ohmic losses therein.

A diverter 42 is located in straight section 12 of tube 10 for removing impurity ions therefrom. It comprises a housing 46 defining chamber 48, in effect, an enlargement in the chamber 11. Chamber 48 is evacuated by a vacuum pump, not shown, through a port 50. Electrical winding 52 in chamber 48 and with an internal diameter larger than tube 10 is electrically energized by a direct voltage source (such as the same voltage source used to energize winding 20) in the direction of arrow 54 and provides a magnetic field in chamber 48 which locally distorts the confining magnetic field represented by magnetic field lines 17. This causes the confining magnetic field lines near to the wall of tube 10 to be bent into chamber 48 as shown by typical magnetic field line 56. Parallel, non-magnetic metallic impurity-ion-collector plates 60 and 62 form an enclosure 63 within which electrical winding 52 is disposed and divide chamber 48 into subchambers 64 and 66. Magnetic field line 56 thus enters subchamber 64, passes through collector plates 60 and 62, enters subchamber 66 and reenters tube 10 therefrom, leaving impurity ions in the divertor whence they are removed by pumping.

An ion-cyclotron resonance generating section 67 for plasma heating is located in straight section 12. It includes an electrical winding 68 wound on insulating tube 70 which forms a part of the stellarator tube 10. Insulating tube 70 and electrical winding 68 are disposed within chamber 102 of generating section housing 104 and coaxial with straight section 12. Insulating tube 70 is sealed to the torus wall to insulate winding 68 from the plasma. Generating section housing 104 includes annular, ring-like end plates 106 and 108 hermetically sealed to section 12 of tube 10. Winding 68 comprises winding sectors 72, 74, 76 and 78. Outer winding sectors 72 and 78 (nearest to the ends of tube 70) are wound in one direction about insulator tube 70, and inner winding sectors 74 and 76 are wound in the opposite direction about the tube axis, e.g., clockwise and counterclockwise viewed from one end of tube 70, respectively. Although an even number of winding sectors is shown, the number may be odd provided it is greater than one. Electrical winding 68 is energized by radiofrequency voltage generator 80 through high voltage conductor 82 connected between plates 84 and 86 of capacitors 88 and 90, respectively. Plate 92 of capacitor 90 is connected to juncture 94 of coil sectors 74 and 76 by conductor 93. Low voltage conductors 96 and 98 (e.g., at ground potential) connect radiofrequency voltage generator 80 to opposite ends of coil 68. Plate 100 of capacitor 88 is also connected to conductor 98. The capacitors 88 and 90 are selected so as to match the input impedence of coil 68 to the output impedence of radiofrequency generator 80. Thus, radiofrequency generator 80 causes coil 68 to produce a varying magnetic field (periodic both in time and distance) along the axis 24 of insulator tube 70.

A portion of tube 10 indicated by the reference letter $f$ includes a portion of the helical winding 22 and an embodiment 110 of the circularizer in accordance with this invention, as described hereinafter.

Referring now to FIGURE 2, there is illustrated a largest magnetic surface 116 (triangular in cross section) which confines plasma and the circle 118 into which it is transformed in accordance with this invention. The triangular shape is similar to a triangle which has its corners rounded and its sides bent outward. The surfaces as they extend around the tube 10 have the appearance of a helical surface formed by rotation about and progression along the axis 24 of tube 10 of the triangular shape of the surface involved. The ends 120 and 122 of adjacent helical windings are shown. Windings 120 carry current I out of the plane of FIG. 2 and windings 122 carry current I into the plane of FIG. 2. A circularizer includes a current loop at the end of each helical winding 120 and 122. The current loops at the ends of windings 120 have opposite polarity to those at the ends of windings 122.

Referring now to FIG. 3, a diagrammatic illustration of the portion $f$ of the stellarator tube, the circularizer of this invention in its generalized form includes rectangular-like current loops 124 and 126 at the termini of helical windings 120 and 122, on the surface of the tube 10 according to the aforesaid requirement. Currents perpendicular to the axis 24 of tube 10 do not affect the operation of the circularizer. They merely push the magnetic lines in or pull them out in the region of the circularizer.

Figure 4:
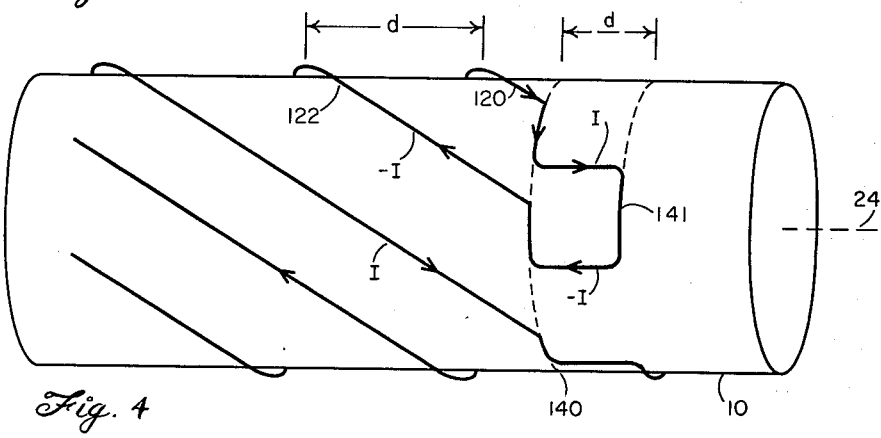
FIGURE 4 is a diagrammatic view of a portion of the stellarator tube showing helical windings and a rectangular-like current loop of an embodiment of the circularizer.

An embodiment of the circularizer is illustrated in FIG. 4. At the circular intersection (indicated by reference numeral 140) of a plane with the tube wall, each helical winding 120, 122, etc. is bent to follow the line of the intersection. Thence, each winding, for example winding 120, runs along intersection 140, half the distance to its adjacent helical winding e.g. winding 122, and then at a right angle, parallel to the axis 24 a distance $d/\pi$ ($d$ is the distance between adjacent helical windings 120 and 122 along the tube 10). A portion 141 winding along an intersection parallel to intersection 140 connects the ends of adjacent windings in pairs, where they are bent to connect to the neighboring helical winding 122.

Figure 5:
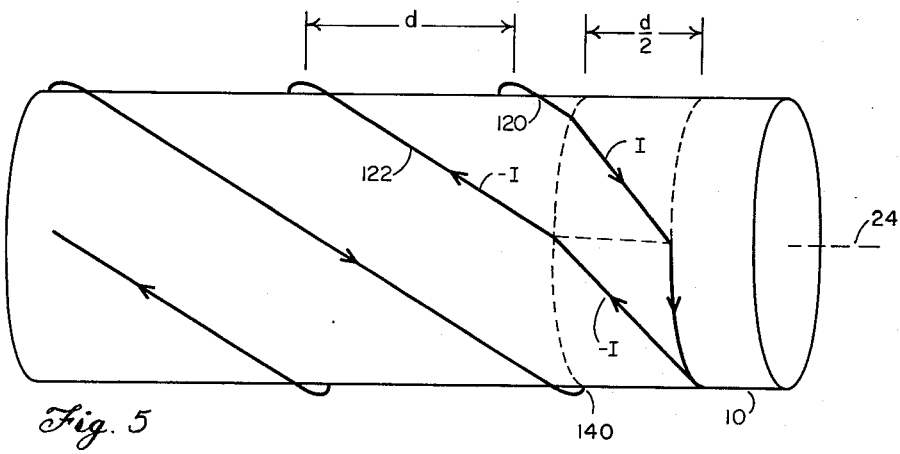
FIGURE 5 is a diagrammatic view of a portion of the stellarator tube showing helical windings and a rhombus-like current loop of an embodiment of the circularizer, which extends along the stellarator tube one-half the distance between adjacent helical windings.

A second embodiment of the circularizer is illustrated in FIG. 5. The helical windings 120 and 122 are bent at intersection 140 so that the tangent of the angle they make with the axis 24 of the tube 10 is just doubled. They then run for the distance that brings each winding to a line on the tube 10 surface parallel with axis 24 and intersecting the ends of the adjacent winding. They are then connected in pairs by a wire parallel to the intersection 140.

Figure 6:
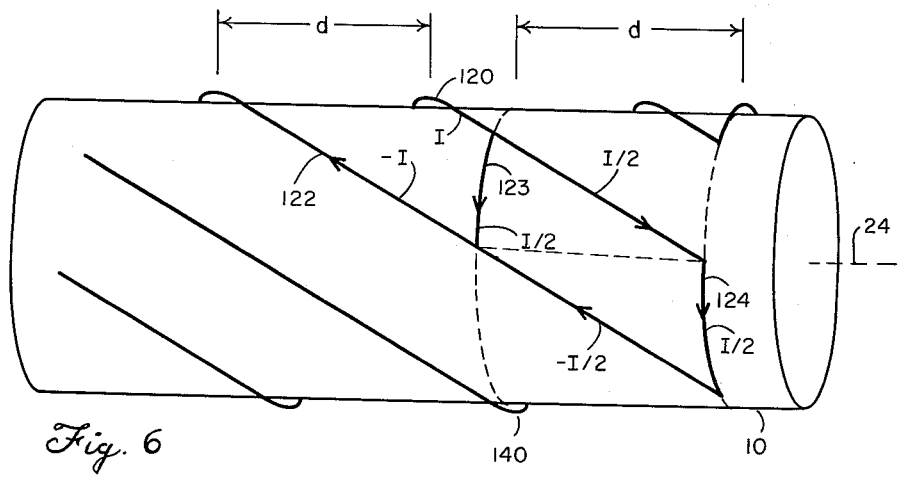
FIGURE 6 is a diagrammatic view of a portion of the stellarator tube showing helical windings and a rhombus-like current loop of an embodiment of the circularizer, which extends along the stellarator tube the distance between adjacent helical windings.

A third embodiment of the circularizer is illustrated in FIG. 6. Half the current in each winding 120 is shunted on wire 123 along intersection 140 to the adjacent winding 122. Helical windings 120 and 122 continue on normally until they reach a line parallel to axis 24 and intersecting the end of the adjacent winding. Adjacent windings are then joined in pairs by a wire 124 parallel to intersection 140.

Figure 7:
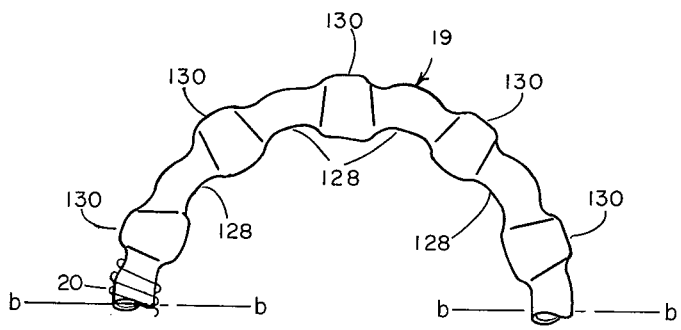
FIGURE 7 is a diagrammatic view of a reverse curvature section for a stellarator illustrating an end loop for the stellarator which has portions with positive and negative curvature.

FIG. 7 shows a diagrammatic view of a reverse curvature end loop 19 for the stellarator of FIG. 1. Portions 128 have positive curvature and portions 130 have negative curvature. The portions alternate with one another with smooth transition surfaces between them. The lengths of portions 130 are slightly shorter than portions 128. The shorter length of portions 130 is compensated for by their having a larger tube diameter than section 128. By negative curvature is meant that the center of the curve of the tube axis is outside the stellarator tube loop, positive curvature is the reverse.

In the event there is charge separation due to the curvature of end loop 19 (causing current flow along the magnetic lines in the tube 10), the charge separation resulting from the curvature of section 128 is compensated by an equal but oppositely-directed charge separation resulting from the curvature of sections 130. Charge separation tends to reduce the value of the ratio of plasma pressure to magnetic field pressure. It is desirable, for obtaining maximum power output from a stellarator, that the ratio of plasma pressure to magnetic field pressure be as large as possible. In a stellarator the largest possible value of the ratio is one.

In order that the reverse curvature end loop meet the straight sections 12 and 14, it is required that the total curvature in the sections 128 (of positive curvature) exceed the total curvature in the sections 130 (of negative curvature) by 180°. This result can be achieved either by using a shorter radius of curvature in the sections 128 than in sections 130, or by making sections 128 of greater length than sections 130, or both.

The amount of charge separation along a line of force in each section will depend on the radius of curvature, the length, the plasma pressure and the magnetic field. In order that the currents flowing along a line of force, from a section 128, generated by charge separation in section 128, just cancel out the charge separation along the same line of force in section 130, the ratio of the two magnetic fields must be properly adjusted. This adjustment may be determined theoretically, or may be determined empirically by varying the ratio of magnetic fields in the two sections until the maximum plasma pressure is achieved.

The thermonuclear reactor shown in FIG. 1 is operated as follows: Tube 10 is evacuated via tube 21 and reactant gas atoms 23 are introduced into chamber 11. Axial confining magnetic field electrical winding 20 and cooperating parts thereof, 22, 140, 120, 122 and 52 are energized by a voltage means, not shown, approximately at the same time as the reactive atoms 23, e.g., deuterium, are introduced into chamber 11. Then, the reactive atoms are initially ionized to a plasma by a radio frequency discharge produced by ferrite ring 26 as aforesaid. The ohmic heating ring 34 is used to bring the plasma to a state of almost complete ionization and to provide some heating of the plasma. The amount of ohmic heating needed is dependent upon the particular conditions of operation of the reactor such as pressure and temperature. Next, the plasma is heated by means of generating section 67.

The circularizer 110 in accordance with this invention transforms the helical magnetic surfaces established by helical winding 22 into a magnetic surface of circular cross section for the divertor 42 and for the generating section 67, in order to increase the efficiency of the stellarator. The reverse curvature section of FIG. 7, in accordance with this invention, increases the ratio of plasma pressure to magnetic field pressure.

Reference is made to patent applications S.N. 688,089, filed October 3, 1957 and S.N. 705,071, filed December 24, 1957 for Spitzer, and S.N. 745,778 filed June 30, 1958 for Stix, for techniques, apparatus and methods for producing and controlling plasmas suitable for use with this invention.

While the invention has been disclosed with respect to certain preferred embodiments, it will be apparent to those skilled in the art that numerous variations and modifications may be made within the spirit and scope of the invention, and thus it is not intended to limit the invention except as defined in the following claims.

We claim:

1. In apparatus for heating and confining a plasma including an endless tube having end loops and sections connecting said loops defining a chamber, means for establishing a plasma in said chamber, means for heating said plasma, means for removing impurity atoms from said plasma, magnetic field producing means for stably confining said plasma in said chamber, said plasma exerting pressure against said magnetic field, said latter means including a plurality of helical windings on said tube to establish a helical magnetic surface within said tube within which said plasma is stably confined, said adjacent helical windings carrying current oppositely, the improvement including a circularizer, said circularizer comprising a plurality of current loops, said current loops being established by bending alternate helical windings to the respective adjacent windings and then running them a distance $d/\pi$ along said tube where they are bent so as to connect up with the adjacent windings, where $d$ is the distance measured along said tube between adjacent helical windings.

2. In apparatus for heating and confining a plasma including an endless tube having end loops and sections connecting said loops defining a chamber, means for establishing a plasma in said chamber, means for heating said plasma, means for removing impurity atoms from said plasma, magnetic field producing means for stably confining said plasma in said chamber, said plasma exerting pressure against said magnetic field, said latter means including a plurality of helical windings on said tube to establish a helical magnetic surface within said tube within which said plasma is stably confined, said adjacent helical windings carrying current oppositely, the improvement including a circularizer, said circularizer comprising a plurality of current loops; said current loops being established by bending said helical windings so that the tangent of the angle they make with the axis of said tube is doubled, running them a distance $d/2$ and connecting adjacent helical windings thereat, where $d$ is the distance measured along said tube between adjacent helical windings.

3. In apparatus for heating and confining a plasma including an endless tube having end loops and sections connecting said loops defining a chamber, means for establishing a plasma in said chamber, means for heating said plasma, means for removing impurity atoms from said plasma, magnetic field producing means for stably confining said plasma in said chamber, said plasma exerting pressure against said magnetic field, said latter means including a plurality of helical windings on said tube to establish a helical magnetic surface within said tube within which said plasma is stably confined, said adjacent helical windings carrying current oppositely, the improvement including a circularizer, said circularizer comprising a plurality of current loops, said current loops being established by terminating the helical windings by shortening adjacent windings at a cross section of said tube and reducing the current in said windings to one half over the final distance $d$ by shunting one half the current in adjacent windings, where $d$ is the distance measured along said tube between adjacent helical windings.

4. In apparatus for heating and confining a plasma including an endless tube having end loops and sections connecting said loops defining a chamber, means for establishing a plasma in said chamber, means for heating said plasma, means for removing impurity atoms from said plasma, magnetic field producing means for stably confining said plasma in said chamber, said plasma exerting pressure against said magnetic field, said latter means including a plurality of helical windings on said tube to establish a helical magnetic surface within said tube within which said plasma is stably confined, said adjacent helical windings carrying current oppositely, the improvement comprising a reverse curvature section in at least one of said end loops, said reverse curvature section including at least one section of positive curvature and at least one section of negative curvature, said negative curvature section being wider and shorter than said negative curvature section.

5. In apparatus for heating and confining a plasma including an endless tube having end loops and sections connecting said loops defining a chamber, means for establishing a plasma in said chamber, means for heating said plasma, means for removing impurity atoms from said plasma, magnetic field producing means for stably confining said plasma in said chamber, said plasma exerting pressure against said magnetic field, said latter means including a plurality of helical windings on said tube to establish a helical magnetic surface within said tube within which said plasma is stably confined, said adjacent helical windings carrying current oppositely, the improvement consisting of a circularizer including a current loop at each end of a conductor of a helical winding.

6. In apparatus for heating and confining a plasma including an endless tube having end loops and sections connecting said loops defining a chamber, means for establishing a plasma in said chamber, means for heating said plasma, means for removing impurity atoms from said plasma, magnetic field producing means for stably confining said plasma in said chamber, said plasma exerting pressure against said magnetic field, said latter means including a plurality of helical windings on said tube to establish a helical magnetic surface within said tube within which said plasma is stably confined, said adjacent helical windings carrying current oppositely, the improvement consisting of a circularizer including a current loop at each end of a conductor of a helical winding, said current loop being of rectangular form linking adjacent turns.

7. In apparatus for heating and confining a plasma including an endless tube having end loops and sections connecting said loops defining a chamber, means for establishing a plasma in said chamber, means for heating said plasma, means for removing impurity atoms from said plasma, magnetic field producing means for stably confining said plasma in said chamber, said plasma exerting pressure against said magnetic field, said latter means including a plurality of helical windings on said tube to establish a helical magnetic surface within said tube within which said plasma is stably confined, said adjacent helical windings carrying current oppositely, the improvement consisting of a circularizer including a current loop at each end of a conductor of a helical winding, said current loop being of rhomboidal form linking adjacent turns.

8. In apparatus for heating and confining a plasma including an endless tube having end loops and sections connecting said loops defining a chamber, means for establishing a plasma in said chamber, means for heating said plasma, means for removing impurity atoms from said plasma, magnetic field producing means for stably confining said plasma in said chamber, said plasma exerting pressure against said magnetic field, said latter means including a plurality of helical windings on said tube to establish a helical magnetic surface within said tube within which said plasma is stably confined, said adjacent helical windings carrying current oppositely, the improvement consisting of a circularizer including a current loop at each end of a conductor of a helical winding, said current loop including a conductor shunting one-half the current of adjacent turns and a rhomboidal form loop carrying one-half the current of adjacent turns.

9. In a high temperature reactor of the type having an endless tube forming a chamber with end loops, means for establishing a plasma in said chamber, means for heating said plasma, and magnetic field producing means having a plurality of oppositely energized helical windings on said tube for producing a helical magnetic surface in said chamber that confines said plasma in said chamber, the improvement, comprising a circulizer at the end of said helical windings for transforming said helical magnetic surface into a substantially circular magnetic surface, and reverse curvature sections formed in said end loops for minimizing the current flow in said helical windings.

References Cited in the file of this patent

UNITED STATES PATENTS 2,910,414    Spitzer _____ Oct. 27, 1959

OTHER REFERENCES

Project Sherwood, by A. S. Bishop, Addison Wesley Publishing Co., Reading, Mass., Sept. 1958, page 189.

Reviews of Modern Physics, vol. 28, No. 3, July 1956. R. F. Post, pp. 338, 339, 359, 362.

The proposed Model C. Stellerator Facility, U.S. Atomic Energy Commission, NYO-7899, Aug. 29, 1957, pp. 1-32, 78, 79, 114, 115, 121, 122, 123, 124, 131, 133, 182-186.